US012062986B2

(12) United States Patent
Naji et al.

(10) Patent No.: US 12,062,986 B2
(45) Date of Patent: *Aug. 13, 2024

(54) DUAL PATH AND MODE START-UP CIRCUIT

(71) Applicant: Appulse Power Inc., Toronto (CA)

(72) Inventors: Arshan Naji, Thornhill (CA); Aleksandar Radic, Toronto (CA)

(73) Assignee: Appulse Power Inc., Toronto (CA)

( * ) Notice: Subject to any disclaimer, the term of this patent is extended or adjusted under 35 U.S.C. 154(b) by 367 days.

This patent is subject to a terminal disclaimer.

(21) Appl. No.: 17/451,378

(22) Filed: Oct. 19, 2021

(65) Prior Publication Data
US 2022/0038011 A1   Feb. 3, 2022

Related U.S. Application Data

(63) Continuation of application No. 16/445,867, filed on Jun. 19, 2019, now Pat. No. 11,159,088.

(51) Int. Cl.
*H02M 3/335* (2006.01)
*H02M 1/36* (2007.01)
*H02M 1/00* (2006.01)

(52) U.S. Cl.
CPC ......... *H02M 3/33507* (2013.01); *H02M 1/36* (2013.01); *H02M 1/0006* (2021.05)

(58) Field of Classification Search
CPC ......... H02M 3/33507; H02M 3/33523; H02M 3/33561; H02M 3/18; H02M 3/07; H02M 1/36; H02M 1/0006
See application file for complete search history.

(56) References Cited

U.S. PATENT DOCUMENTS

| 5,640,317 A | 6/1997 | Lei | |
|---|---|---|---|
| 2014/0028095 A1* | 1/2014 | Maru | H05B 45/385 307/31 |
| 2014/0063875 A1 | 3/2014 | Al-Shyoukh et al. | |
| 2014/0268924 A1 | 9/2014 | Tang et al. | |

(Continued)

OTHER PUBLICATIONS

Notice of Allowance and Fees dated Jun. 29, 2021 for U.S. Appl. No. 16/445,867.

(Continued)

*Primary Examiner* — Nguyen Tran
(74) *Attorney, Agent, or Firm* — MLO, a professional corp.

(57) ABSTRACT

A dual path and mode start-up circuit includes a high-voltage start-up circuit, an auxiliary start-up circuit, a capacitor, and a sensing circuit. The high-voltage start-up circuit has high-voltage input and output voltage nodes and is configurable to be operated in a first or second mode of operation. The auxiliary start-up circuit has auxiliary input and output voltage nodes. The auxiliary output voltage node, the high-voltage output voltage node, and the capacitor are in signal communication. The sensing circuit is configured to sense a voltage level at the capacitor and to configure the high-voltage start-up circuit to operate in the first mode of operation if the voltage level at the capacitor is less than a first threshold voltage level, and configure the high-voltage start-up circuit to operate in the second mode of operation if the voltage level at the capacitor is greater than a second threshold voltage level.

19 Claims, 7 Drawing Sheets

(56) References Cited

U.S. PATENT DOCUMENTS

| | | | |
|---|---|---|---|
| 2015/0280577 A1* | 10/2015 | Ohtake | H02M 3/33507 |
| | | | 363/21.02 |
| 2016/0141964 A1 | 5/2016 | Yu et al. | |
| 2016/0352237 A1* | 12/2016 | Quigley | H02M 1/08 |
| 2019/0013740 A1 | 1/2019 | Lin | |
| 2019/0020277 A1 | 1/2019 | Liu et al. | |

OTHER PUBLICATIONS

Office Action dated Feb. 20, 2020 for U.S. Appl. No. 16/445,867.
Office Action dated Oct. 1, 2020 for U.S. Appl. No. 16/445,867.

\* cited by examiner

DUAL PATH AND MODE START-UP CIRCUIT

CROSS-REFERENCE TO RELATED APPLICATION

This application is a continuation of U.S. Non-Provisional application Ser. No. 16/445,867, filed Jun. 19, 2019, which is incorporated by reference herein in its entirety.

BACKGROUND

Start-up circuits are utilized in many power converters to provide initial power and bias voltages to components of the power converter, such as controllers and switch driver circuitry. Additionally, some power converter start-up circuits force a voltage at a node, or a current into a branch, of the power converter to a specific initialization state after which normal operation of the power converter may begin.

A typical component of a power converter start-up circuit is a low-dropout regulator ("LDO") that can regulate an output voltage even when the supply voltage of the LDO is close to the output voltage. In general, the advantages of an LDO over other DC-to-DC regulators include the absence of switching noise (because no switching takes place), smaller device size (because neither large inductors nor transformers are needed), and greater design simplicity. However, a disadvantage is that, unlike switching regulators. LDOs dissipate power, and thus heat, across the regulation device in order to regulate the output voltage. Specifically, in an LDO, the power loss is a function of the highest voltage of operation of the LDO and the output current of the LDO. As such, an LDO with even a small output current may produce an unacceptable high power loss if that LDO is configured to operate at a high voltage.

SUMMARY

In some embodiments, a dual path and mode start-up circuit includes a high-voltage start-up circuit having a high-voltage input voltage node and a high-voltage output voltage node. The high-voltage start-up circuit is configurable to be operated in a first mode of operation or a second mode of operation. The dual path and mode start-up circuit includes an auxiliary start-up circuit having an auxiliary input voltage node and an auxiliary output voltage node, the auxiliary output voltage node being in signal communication with the high-voltage output voltage node. The dual path and mode start-up circuit includes a first capacitor in signal communication with the high-voltage output voltage node and the auxiliary output voltage node, and a sensing circuit in signal communication with the first capacitor. The sensing circuit is configured to sense a voltage level at the first capacitor and, in response, configure the high-voltage start-up circuit to operate in the first mode of operation if the voltage level at the first capacitor is less than a first threshold voltage level, and configure the high-voltage start-up circuit to operate in the second mode of operation if the voltage level at the first capacitor is greater than a second threshold voltage level.

In some embodiments, a method for operating a dual path and mode start-up circuit having a high-voltage start-up circuit, an auxiliary start-up circuit, a sensing circuit, and a first capacitor, where the high-voltage start-up circuit is configured to operate in a first mode of operation and in a second mode of operation, involves receiving a high-voltage input at the high-voltage start-up circuit. A first output voltage at the high-voltage start-up circuit is produced using the high-voltage input when the high-voltage start-up circuit is operating in the first mode of operation. The first capacitor is charged using the first output voltage to generate an auxiliary-voltage output. An auxiliary current is received at the auxiliary start-up circuit from an auxiliary winding that is in signal communication with the auxiliary start-up circuit. An output voltage is produced at the auxiliary start-up circuit. The first capacitor is charged using the produced output voltage from the auxiliary start-up circuit. The sensing circuit determines if the auxiliary-voltage output is less than a first threshold voltage level or if the auxiliary-voltage output is greater than a second threshold voltage level. The high-voltage start-up circuit is configured to the second mode of operation if the auxiliary-voltage output is greater than the second threshold voltage level. A second voltage output is produced at the high-voltage start-up circuit when the high-voltage start-up circuit is in the second mode of operation, the second voltage output having a voltage level that is lower than a voltage level of the first output voltage. The high-voltage start-up circuit is configured to the first mode of operation if the auxiliary-voltage output is less than the first threshold voltage level. The foregoing steps, from receiving a high-voltage input at the high-voltage start-up circuit to configuring the high-voltage start-up circuit to the first mode of operation if the auxiliary-voltage output is less than the first threshold voltage level, are repeated.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The disclosure may be better understood by referring to the following figures. In the figures, like reference numerals designate corresponding parts throughout the different views.

DETAILED DESCRIPTION

In the following description, like reference numbers are used to identify like elements. Furthermore, the drawings are intended to illustrate major features of example embodiments in a diagrammatic manner. The drawings are not intended to depict every feature of actual embodiments.

A dual path and mode ("DPM") start-up circuit ("start-up circuit") is disclosed herein. The DPM start-up circuit may be utilized in conjunction with a power converter such as, for example, a switched-mode power converter, a flyback converter, a forward converter, or other power converter. As disclosed herein, the DPM start-up circuit is configured to be in signal communication with an auxiliary winding of a mutually coupled inductor such as a transformer of the power converter. At a high level, the dual path and mode start-up circuit is configurable to operate in two modes of operation, the mode of operation being selected based on a sensed voltage level of an output voltage $V_{out\text{-}aux}$ that is produced by the DPM start-up circuit. The output voltage $V_{out\text{-}aux}$ may be used as an operating voltage by the power converter (e.g., to power a gate driver circuit, or other circuit of the power converter). The first mode of operation is suitable to provide the output voltage $V_{out\text{-}aux}$ during initial start-up or light load operation of the power converter. The second mode of operation is suitable to provide the output voltage $V_{out\text{-}aux}$ when the power converter is generating a sufficient voltage at an auxiliary winding of a transformer of the power converter. Because each mode of operation is selected based on the sensed voltage level of the output voltage $V_{out\text{-}aux}$, and because operation of the DPM start-up circuit is bimodal, an analog feedback loop that requires compensation (e.g., using a large compensation capacitor) can advantageously be omitted from the DPM start-up circuit.

As disclosed herein, the DPM start-up circuit includes a high-voltage (HV) start-up circuit and an auxiliary (AUX) start-up circuit. In an example of a first mode of operation of the DPM start-up circuit, the DPM start-up circuit performs a process that includes receiving a high-voltage input ("$V_{HV}$") (e.g., a DC bus voltage of the power converter) at the HV start-up circuit, and producing a first output voltage ("$V_{High}$") at the HV start-up circuit, where the first output voltage $V_{High}$ is a stepped down voltage of the high-voltage input $V_{HV}$. While in the first mode of operation, the HV start-up circuit charges energy storage capacitors of the DPM start-up circuit using the initial output voltage $V_{High}$ to provide the output voltage $V_{out\text{-}aux}$ at a first capacitor of the energy storage capacitors. After operation of the power converter commences, the DPM start-up circuit then receives an auxiliary current ("$I_{Aux}$") from an auxiliary winding of the power converter that is in signal communication with the AUX start-up circuit of the DPM start-up circuit. The AUX start-up circuit then provides an output voltage to charge the first capacitor of the energy storage capacitors to provide the output voltage $V_{out\text{-}aux}$. The DPM start-up circuit determines, using a sensing circuit, if the output voltage $V_{out\text{-}aux}$ is less than a first threshold voltage value, or if the output voltage $V_{out\text{-}aux}$ is greater than a second threshold voltage value. If the output voltage $V_{out\text{-}aux}$ is greater than the second threshold voltage value, the mode of operation of the HV start-up circuit is switched to a second mode of operation. During the second mode of operation, the HV start-up circuit produces a second output voltage ("$V_{Low}$"), the second output voltage having a voltage level that is lower than a voltage level of the first output voltage $V_{High}$. The sensing circuit continues to monitor and sense a voltage level (i.e., $V_{out\text{-}aux}$) at the first capacitor. If the output voltage $V_{out\text{-}aux}$ at the first capacitor drops to less than the first threshold voltage value, the mode of operation of the HV start-up circuit is switched back to the first mode of operation and the HV start-up circuit produces the first output voltage $V_{High}$. The DPM start-up circuit then repeats the method while the sensing circuit continuously monitors and senses the voltage level at the first capacitor of the output voltage $V_{out\text{-}aux}$.

In general, the DPM start-up circuit is configured to reduce any needed quiescent current for the HV start-up circuit to zero or approximately zero. That is, all or a portion of the quiescent current needed by the HV start-up circuit is produced by the AUX start-up circuit instead of the HV start-up circuit. The HV start-up circuit, the AUX start-up circuit, and the sensing circuit are capable of being integrated into a single integrated circuit ("IC"). Moreover, the DPM start-up circuit isolates the HV start-up circuit from the auxiliary winding. As such, if the HV start-up circuit utilizes a field-effect transistor ("FET"), the DPM start-up circuit isolates the source and gate of the FET, within the HV start-up circuit, from the auxiliary winding to avoid over-voltage stress of the circuitry within the HV start-up circuit. This results in safe operation for any low voltage devices on any the internal nodes within the DPM start-up circuit.

The dual mode operation of the DPM start-up circuit improves light load efficiency of the power converter by eliminating the need for currents produced from the $V_{HV}$ (which may be for example, a high-voltage input pin external to the DPM start-up circuit) until the voltage level of the output voltage $V_{out\text{-}aux}$ drops to a pre-determined low threshold (i.e., less than the first voltage value). This approach reduces the architecture dependency of the DPM start-up circuit to the voltage range of the auxiliary winding and voltage variations at an output node of the HV start-up circuit. This approach also reduces any voltage ripples of the output voltage $V_{out\text{-}aux}$ for high-voltage inputs that have high changes of voltage versus time.

Figure 1:
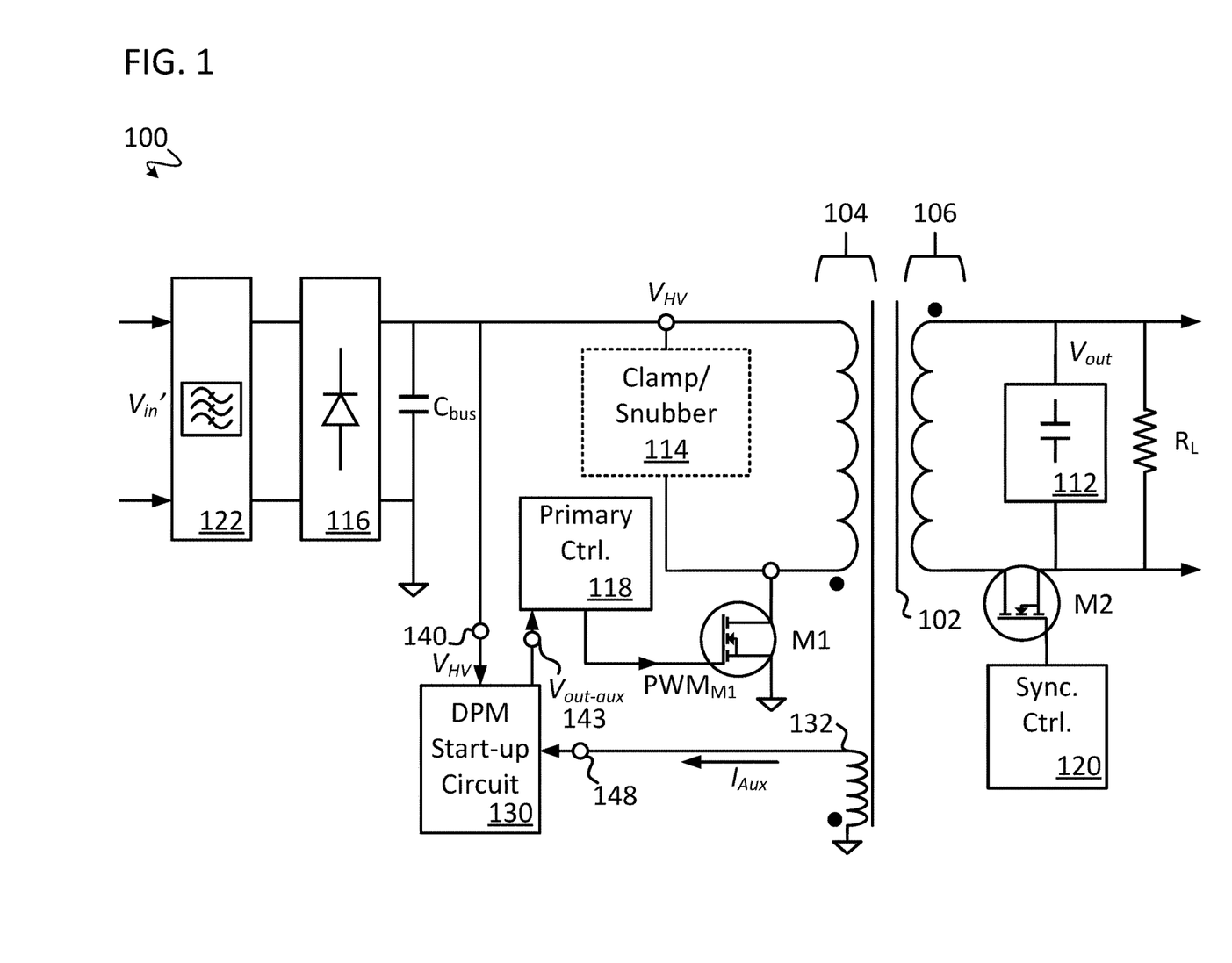
FIG. 1 is a simplified schematic of a power converter that includes an example dual path and mode ("DPM") start-up circuit, in accordance with the present disclosure.

FIG. 1 is a simplified circuit schematic of a power converter 100, in accordance with some embodiments. Some elements of the power converter 100 have been omitted from FIG. 1 for simplicity. A voltage source $V_{in}'$ is received at the power converter 100. $V_{in}'$ can be provided either as an alternating current (AC) or direct current (DC). An input side of the power converter 100 generally includes an input voltage filter block 122, a rectifier block 116 (in the case of AC input), an input voltage buffer capacitor $C_{bus}$, an optional active clamp or snubber circuit block 114, a main switch M1 driven by a pulse-width-modulation (PWM) signal $PWM_{M1}$, a primary side controller circuit ("controller") 118, a primary winding 104 and an auxiliary winding 132 of a transformer 102, and a dual path and mode (DPM) start-up circuit 130. The input voltage filter block 122, rectifier block 116 and the input buffer capacitor $C_{bus}$ provide a filtered, buffered, rectified, or otherwise conditioned input voltage $V_{HV}$ to the transformer 102 and to the DPM start-up circuit 130.

The transformer 102 transfers power from the input side of the power converter 100 to a secondary winding 106 of the transformer 102. The output side of the power converter 100 generally includes the secondary winding 106, an output buffer circuit 112, a synchronous rectifier switch M2, a synchronous rectifier switch controller circuit 120, and is configured to be connected to a load $R_L$.

The DPM start-up circuit 130 receives the input voltage $V_{HV}$ at node 140 when the input voltage $V_{in}'$ is applied to the power converter 100 (i.e., during start-up) and during normal operation of the power converter 100. After the power converter 100 enters an operation state such that the main switch M1 is switching, the auxiliary winding 132 provides an auxiliary current $I_{AUX}$ to the DPM start-up circuit 130 at node 148. The DPM start-up circuit 130 generates an operating voltages $V_{out\text{-}aux}$ at node 143. The operating voltage $V_{out\text{-}aux}$ provides operating power to the primary controller 118, and/or other modules or circuits of the power converter 100 (e.g., gate driver circuitry).

Figure 2:
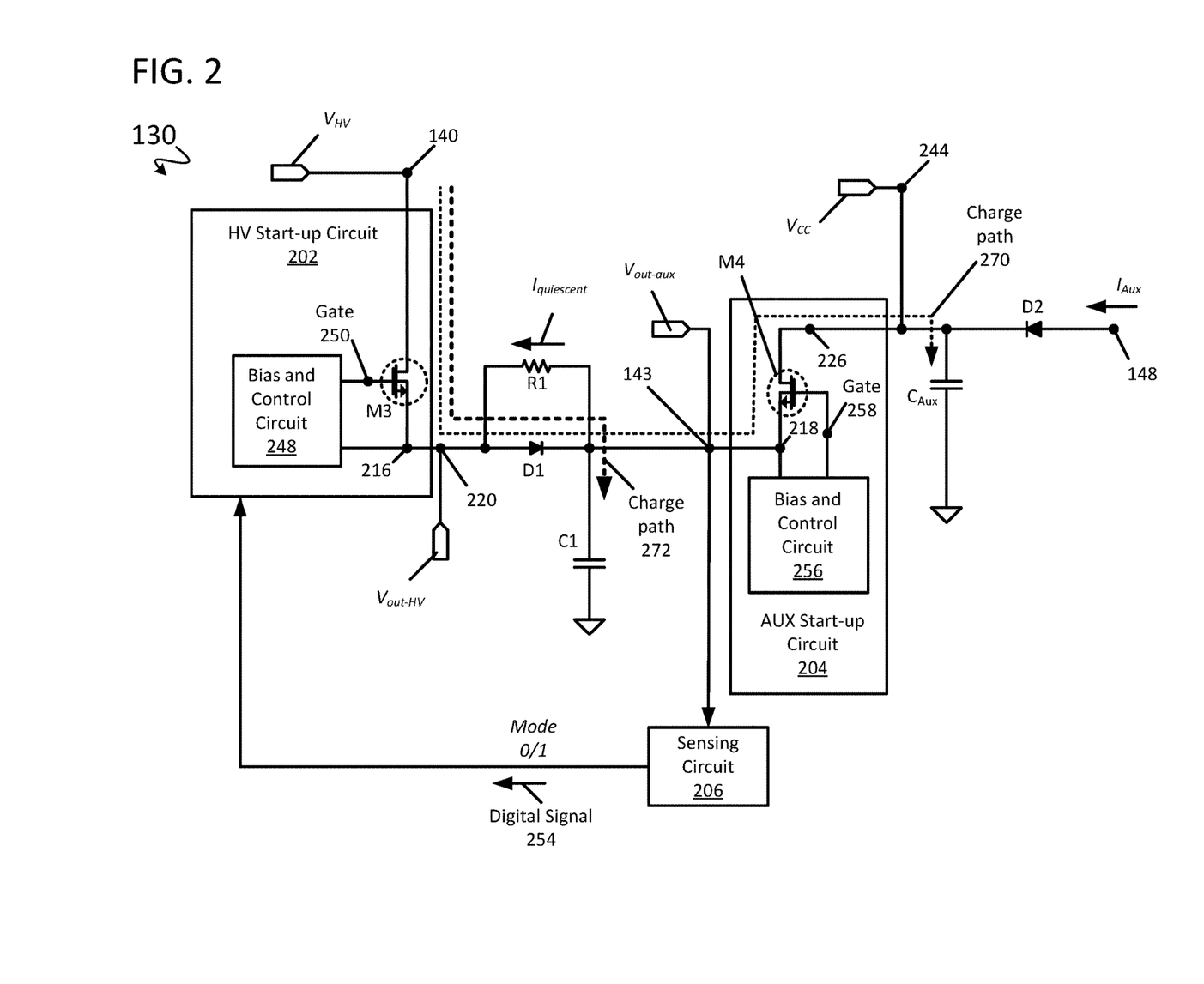
FIG. 2 is a simplified schematic of the example DPM start-up circuit of FIG. 1, in accordance with the present disclosure.

FIG. 2 is a simplified circuit schematic of an example implementation of the DPM start-up circuit 130 of the power converter 100, in accordance with the present disclosure. In general, the DPM start-up circuit 130 includes a HV start-up circuit 202, an AUX start-up circuit 204, a sensing circuit 206, a resistor R1, diodes D1, D2, and capacitors C1, $C_{Aux}$, coupled as shown. The HV start-up circuit 202 generally includes a FET M3, and a bias and control circuit 248. The Aux start-up circuit generally includes a FET M4 and a bias and control circuit 256.

In this example, the HV start-up circuit 202 is in signal communication with the AUX start-up circuit 204 through a parallel connection of the diode D1 and the resistor R1. The diode D1 is forward biased from a source node 216 of the FET M3 to a source node 218 of the FET M4 through the node 143. The auxiliary winding 132 (shown in FIG. 1) is in signal communication with the AUX start-up circuit 204 through the diode D2. The diode D2 is forward biased from the node 148 to a drain node 226 of the FET M4.

The bias and control circuit 248 of the HV start-up circuit 202 is in signal communication with a gate node 250 and the source node 216 of the FET M3 to bias and control the FET M3. Similarly, the bias and control circuit 256 of the AUX start-up circuit 204 is in signal communication with a gate node 258 and the source node 218 of the FET M4 to bias and control the FET M4.

The bias and control circuit 248 of the HV start-up circuit 202 is in signal communication with the sensing circuit 206 and is configured to receive a digital operating mode selection signal 254 (e.g., Mode 0/1) produced by the sensing circuit 206. The digital signal 254 may be a binary signal representative of whether the sensing circuit 206 detects (i.e., senses) that the voltage $V_{out\text{-}aux}$ at node 143 is less than a first threshold voltage value ("$V_1$") or greater than a second threshold voltage value ("$V_2$"), where $V_2$ is greater than $V_1$. If the voltage $V_{out\text{-}aux}$ is less than the first threshold voltage value $V_1$, the sensing circuit 206 produces a first digital output (e.g., a de-asserted output) for the digital signal 254 to cause the HV start-up circuit 202 to be configured in a first mode of operation. If the voltage $V_{out\text{-}aux}$ is greater than the second threshold voltage value $V_2$, the sensing circuit 206 produces a second digital output (e.g., an asserted output) for the digital signal 254 to cause the HV start-up circuit 202 to be configured in a second mode of operation. As an example, the first digital output may be a digital signal having the value of 0 (i.e., Mode 0) and the second digital output may be a digital signal having the value of 1 (i.e. Mode 1).

At startup, or in a light-load condition of the power converter 100, if the sensing circuit 206 determines that the voltage $V_{out\text{-}aux}$ is less than the first threshold voltage value $V_1$, the sensing circuit 206 causes the HV start-up circuit 202 to be configured in the first mode of operation. The HV start-up circuit 202 generates an output voltage designated as $V_{out\text{-}HV}$ at node 220. In the first mode of operation, the HV start-up circuit 202 generates the output voltage $V_{out\text{-}HV}$ having a voltage level $V_{High}$ that is higher than an output voltage $V_{Low}$ generated by the HV start-up circuit 202 in the second mode of operation.

To elaborate, when operating in the first mode (i.e., Mode 0) of operation, the HV start-up circuit 202 receives the input voltage $V_{HV}$ at the node 140 and produces the output voltage $V_{out\text{-}HV}$ having the first voltage level $V_{High}$ at the node 220. While the HV start-up circuit 202 is in the first mode of operation, or for a portion of time while the HV start-up circuit 202 is in the first mode of operation, current flows through charge paths 270, 272 to charge the capacitor C1 and the capacitor $C_{Aux}$ and to thereby generate voltage $V_{CC}$ at the node 244. The generated voltage $V_{CC}$ is sufficient to begin operation of the power converter 100. After operation of the power converter 100 begins (e.g., the main switch M1 begins switching), a voltage develops at the auxiliary winding 132. When the voltage developed at the auxiliary winding 132 is sufficient to forward-bias the diode D2, the auxiliary current $I_{Aux}$ flows from the auxiliary winding 132, through the diode D2, and charges the capacitor $C_{Aux}$. Additionally, current flows from the node 148, through the diode D2 and through the FET M4 to charge the capacitor C1 (i.e., by a stepped-down voltage produced by the AUX start-up circuit 204 upon receiving the auxiliary current $I_{Aux}$). Thus, a voltage across the capacitor C1 closely tracks the voltage across the capacitor $C_{Aux}$.

In this example, the sensing circuit 206 then determines that the output voltage $V_{out\text{-}aux}$ (i.e., the voltage across the capacitor C1) is greater than the second threshold voltage value $V_2$ and therefore causes the HV start-up circuit 202 to be configured in the second mode of operation (i.e., because sufficient voltage is being generated by the auxiliary winding 132). In the second mode of operation, the HV start-up circuit 202 generates a lower output voltage, the lower output voltage being equal to $V_{Low}$. If the voltage across the capacitor C1 exceeds the voltage at the node 220, the diode D1 is no longer forward biased. When the diode D1 is no longer forward-biased, current no longer flows from the HV start-up circuit 202, though the diode D1, to the capacitors C1 and $C_{Aux}$. Additionally, because the voltage level at the node 220 is lower than the voltage $V_{out\text{-}aux}$, a current $I_{quiescent}$ flows through the resistor R1 to the bias and control circuit 248, thereby advantageously providing a quiescent current to the RV start-up circuit 202.

The sensing circuit 206 continues to monitor and sense the voltage level of $V_{out\text{-}aux}$ at the node 143. If the voltage $V_{out\text{-}aux}$ drops below the first threshold voltage level $V_1$ (e.g., due to a light-load condition of the power converter 100), the sensing circuit 206 generates the digital signal 254 to cause the HV start-up circuit 202 to once again be configured in the first mode of operation. The sensing circuit 206 then continues to monitor and sense the voltage level of $V_{out\text{-}aux}$. If/when the voltage $V_{out\text{-}aux}$ rises above the second threshold voltage level $V_2$, the sensing circuit 206 generates the digital signal 254 to cause the HV start-up circuit 202 to once again be configured in the second mode of operation.

In this example, both the HV start-up circuit 202 and AUX start-up circuit 204 may be implemented as low-dropout ("LDO") regulators. The sensing circuit 206 may be implemented as a threshold detector that utilizes hysteresis for determining if the output voltage $V_{out\text{-}aux}$ is less than the first threshold voltage level $V_1$ or greater than the second threshold voltage level $V_2$, where the first threshold voltage level $V_1$ and the second threshold voltage level $V_2$ are generally two predetermined voltages that form a hysteresis diagram for the voltage $V_{out\text{-}aux}$ at the node 143. As an example, the first voltage threshold level $V_1$ may be equal to approximately 8.2 volts and the second threshold voltage level $V_2$ may be equal to approximately 9.6 volts. Moreover, the input voltage $V_{HV}$ may be 400 volts or more. $V_{High}$ may be equal to approximately 15 volts, and $V_{Low}$ may be equal to approximately 1 volt or 0 volts.

In this disclosure, in addition to being a dual mode device, the DPM start-up circuit 130 is also a dual path device that advantageously reduces any needed quiescent current generated by the HV start-up circuit 202 to zero or approximately zero by instead providing the quiescent current $I_{quiescent}$ from the AUX start-up circuit 204 to the HV start-up circuit 202 via the resistor R1. The quiescent current $I_{quiescent}$ is advantageously utilized to power the bias circuity of the bias and control circuit 248.

The DPM start-up circuit 130 may be advantageously integrated into a single integrated circuit ("IC" or "chip"). In this example, the single chip may include the HV start-up circuit 202, the AUX start-up circuit 204, the diodes D1, D2 and the resistor R1. In another example, the single chip may include the HV start-up circuit 202, the AUX start-up circuit 204, the diode D1 and the resistor R1.

Figure 3:
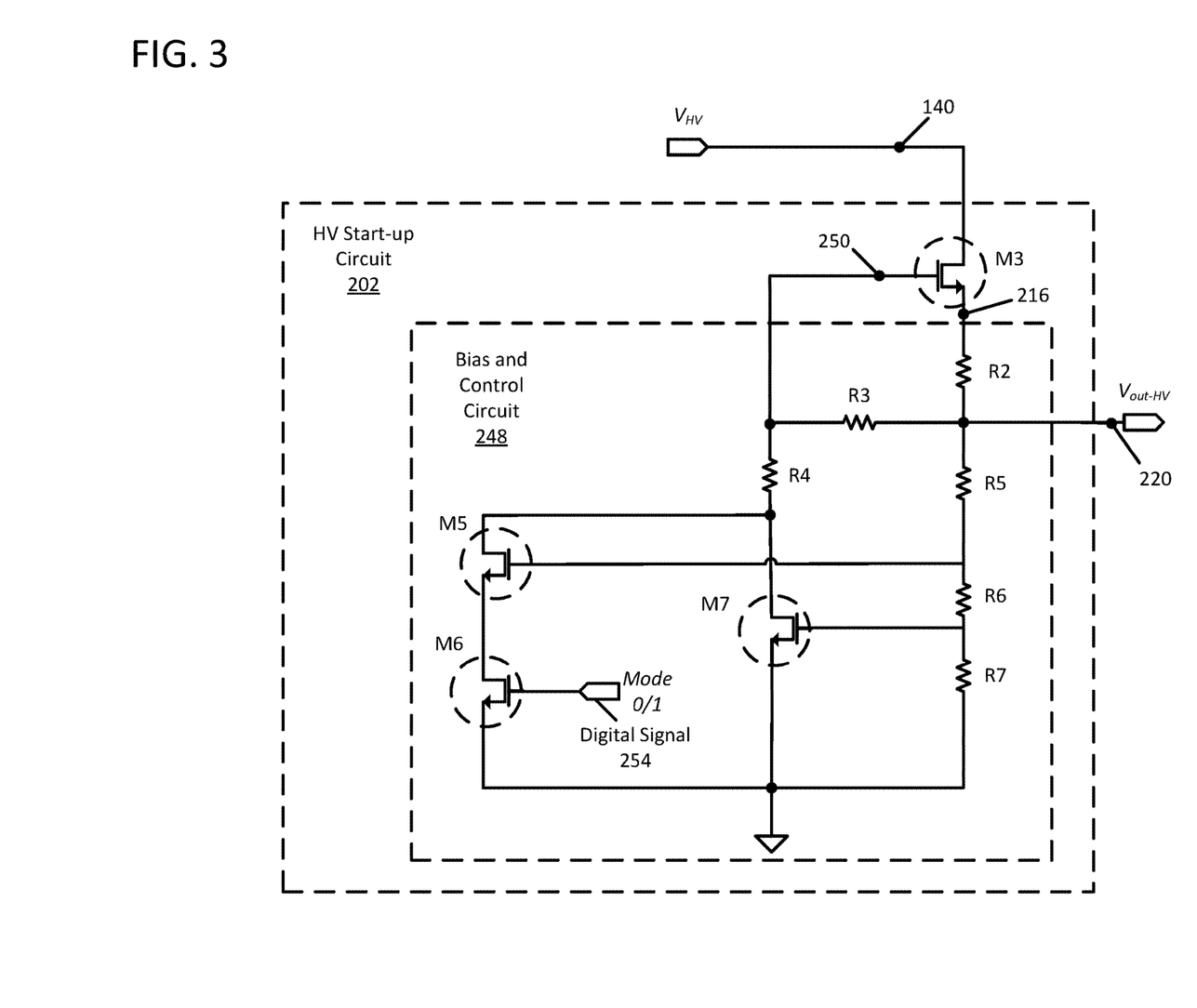
FIG. 3 is a simplified schematic of an example high-voltage ("HV") start-up circuit of the DPM start-up circuit of FIG. 2, in accordance with the present disclosure.

FIG. 3 is a simplified circuit schematic of an example implementation of the HV start-up circuit 202 of the DPM start-up circuit 130, in accordance with the present disclosure. The HV start-up circuit 202 generally includes the FET M3, and the bias and control circuit 248, coupled as shown. The bias and control circuit 248 generally includes resistors R2-R7, and FETs M5-M7. Some components, such as gate driver circuitry, have been omitted from the schematic for simplicity. The FET M6 is configured to be controlled by the digital signal 254 (e.g., directly or via a gate-driver circuit). When the FET M6 is turned off in accordance with the digital signal 254 (Mode 0, corresponding to a digital 0), the HV start-up circuit 202 is configured in the first mode of operation. When the FET M6 is turned on in accordance with the digital signal 254 (Mode 1, corresponding to a digital 1), the HV start-up circuit 202 is configured in the second mode of operation. As previously described, when the HV start-up circuit 202 is in the second mode of operation, the quiescent current $I_{quiescent}$ provides a quiescent current to the bias and control circuit 248 such that a bias current does not need to be generated using the input voltage $V_{HV}$.

Figure 4:
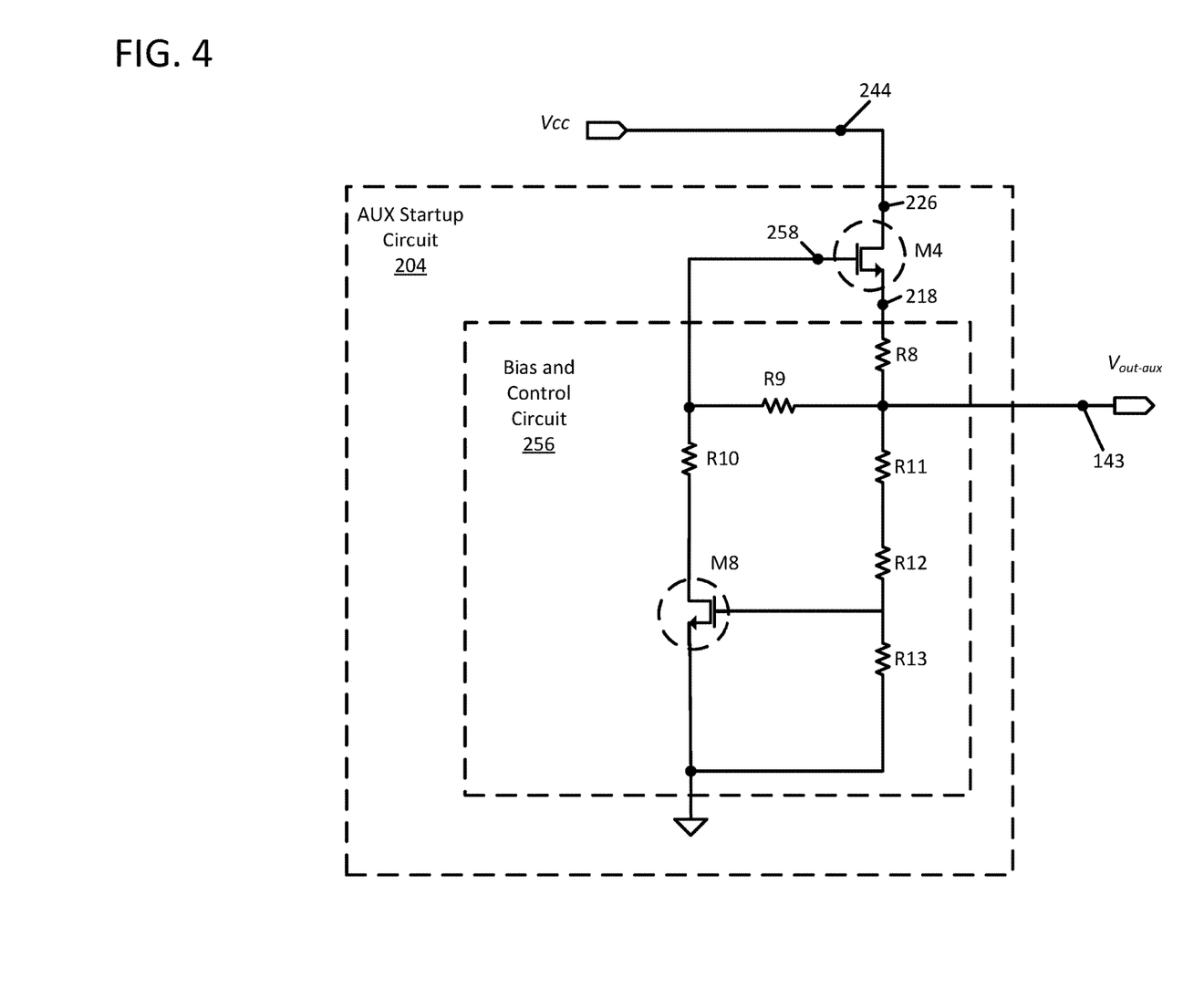
FIG. 4 is a simplified schematic of an example auxiliary-voltage ("AUX") start-up circuit of the DPM start-up circuit of FIG. 2, in accordance with the present disclosure.

FIG. 4 is a simplified circuit schematic of an example implementation of the AUX start-up circuit 204 of the DPM start-up circuit 130, in accordance with the present disclosure. The AUX start-up circuit 204 generally includes the FET M4, and the bias and control circuit 256, coupled as shown. The bias and control circuit 256 generally includes resistors R8-R13, and FET M8. Some components, such as gate driver circuitry, have been omitted from the schematic for simplicity.

Figure 5:
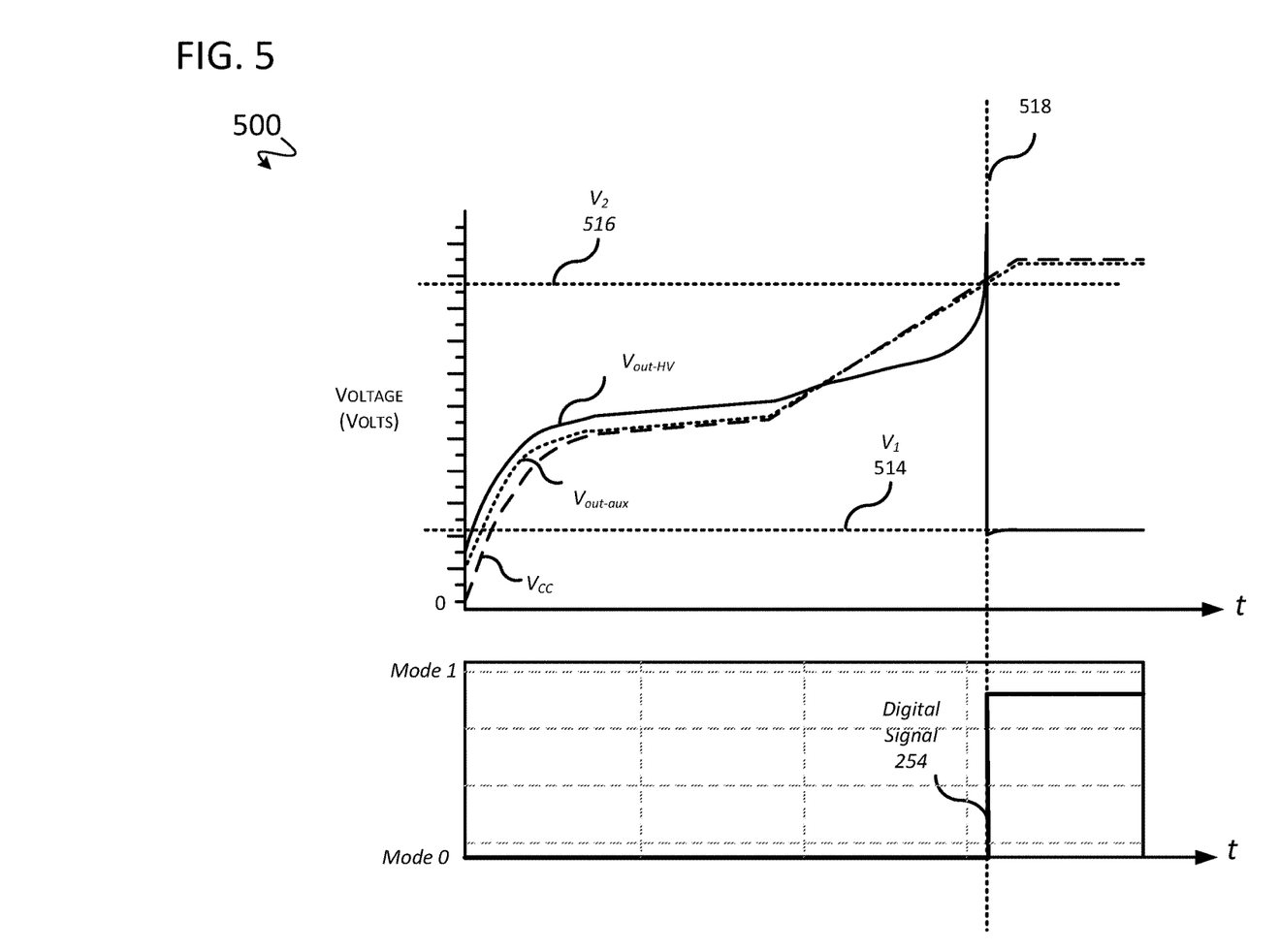
FIG. 5 is a plot of signals related to the operation of the DPM start-up circuit of FIG. 2, in accordance with the present disclosure.

Turning to FIG. 5, plots 500 of the voltages $V_{out-HV}$, $V_{out-aux}$, $V_{CC}$, and the digital signal 254 from FIG. 2 are shown across time t, in accordance with the present disclosure. Also shown are examples of the first threshold voltage level $V_1$ 514, the second threshold voltage level $V_2$ 516 At time 0, the digital signal 254 is de-asserted, and thus the HV start-up circuit 202 is configured to operate in the first mode of operation (i.e., generating voltage $V_{High}$). As time progresses, the capacitors C1, $C_{Aux}$ charge based on the output voltage $V_{out-HV}$. Upon determining, by the sensing circuit 206, that the voltage $V_{out-aux}$ is greater than the second threshold voltage $V_2$ 516 at time 518, the digital signal 254 is asserted, and thus the HV start-up circuit 202 is configured to operate in the second mode of operation (i.e., generating voltage $V_{Low}$), whereon the output voltage $V_{out-HV}$ falls to a lower voltage level (e.g., $V_1$ 514).

Figure 6:
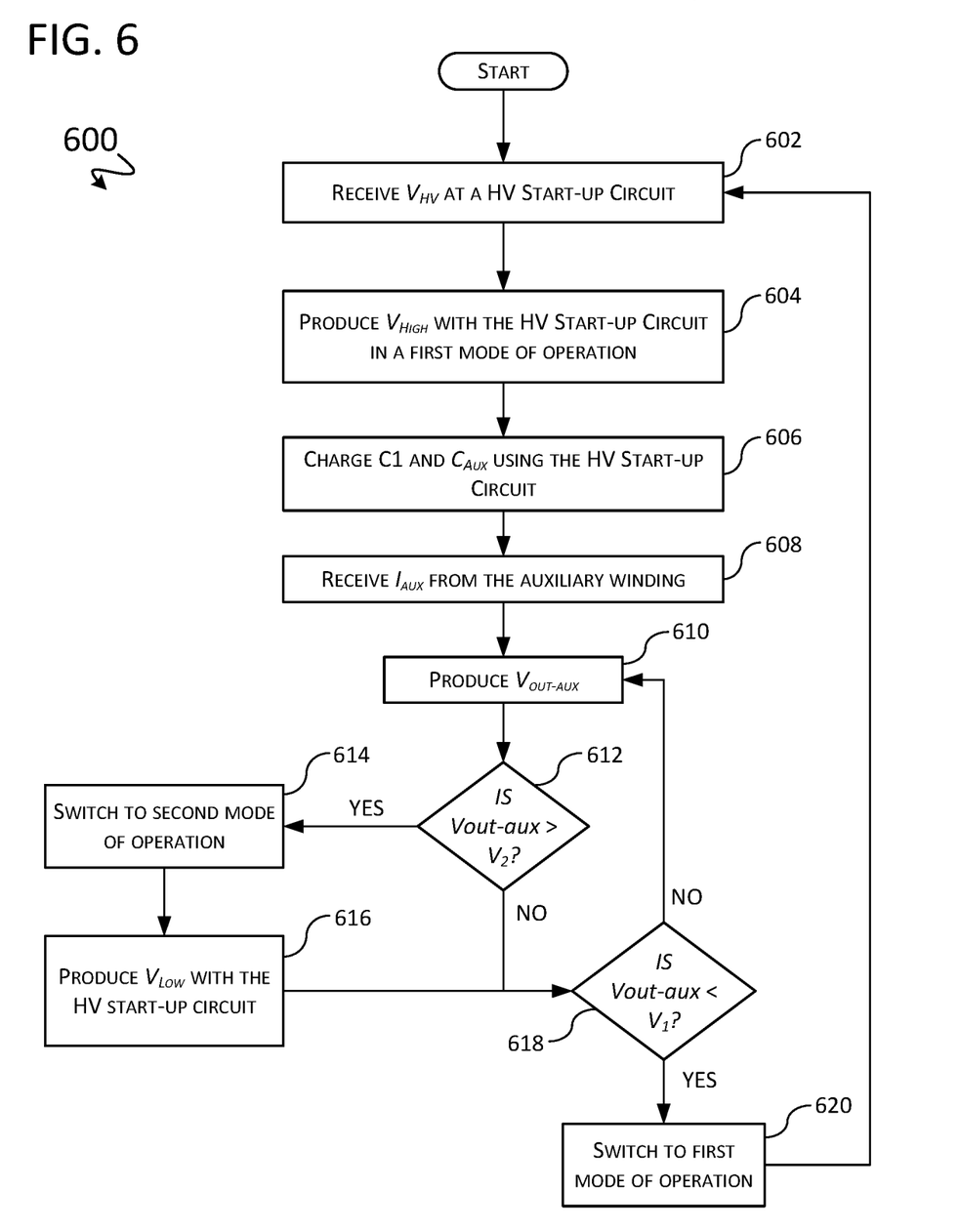
FIG. 6 is a flowchart of an example portion of a process performed by the DPM start-up circuit, shown in FIG. 2, in accordance with the present disclosure.

Turning to FIG. 6, a flowchart is shown of an example portion of a process 600 performed by the DPM start-up circuit 130 in accordance with the present disclosure. The process 600 starts by receiving 602 the input voltage $V_{HV}$ at the HV start-up circuit 202 and producing 604 an output voltage having a voltage level $V_{High}$ at the HV start-up circuit 202. As discussed earlier, the voltage level $V_{High}$ is a stepped down voltage of the voltage $V_{HV}$ and the HV start-up circuit 202 is operating in the first mode of operation. The process 600 then further includes: charging 606 the capacitors C1 and $C_{Aux}$ using the voltage $V_{High}$ generated by the HV start-up circuit 202, while the HV start-up circuit 202 is in the first mode of operation receiving 608 the current $I_{Aux}$ from the auxiliary winding 132; and producing 610 the voltage $V_{out-aux}$ at the capacitor C1 of the DPM start-up circuit 130. The process 600 then utilizes the sensing circuit 206 to determine 612 if the voltage $V_{out-aux}$ is greater than the second threshold voltage $V_2$ and then switches 614 the mode of operation of the HV start-up circuit 202 to the second mode of operation if the voltage $V_{out-aux}$ is greater than the second threshold voltage $V_2$. The process 600 then produces 616 an output voltage having a voltage level $V_{Low}$ at the HV start-up circuit 202 when the HV start-up circuit 202 is in the second mode of operation.

If the process 600 determines 612 that voltage $V_{out-aux}$ is not greater than the second threshold voltage $V_2$, or after the process 600 produces 616 the voltage $V_{Low}$ at the HV start-up circuit 202, the process 600 determines 618 if the voltage $V_{out-aux}$ is less than the first threshold voltage $V_1$. If the voltage $V_{out-aux}$ is less than the first threshold voltage $V_1$, the process 600 switches 620 the mode of operation of the HV start-up circuit 202 back to the first mode of operation. Once the HV start-up circuit 202 is configured back to the first mode of operation, the process 600 then repeats and returns to receiving 602 the input voltage $V_{HV}$ at the HV start-up circuit 202 and producing 604 the voltage $V_{High}$ at the HV start-up circuit 202. If, instead, the process 600 determines 618 that the voltage $V_{out-aux}$ is not less than the first threshold voltage $V_1$, the process 600 repeats and returns to step 610.

In this example, the steps shown in the process 600 may include a number of sub-steps that perform the functions previously described.

Figure 7:
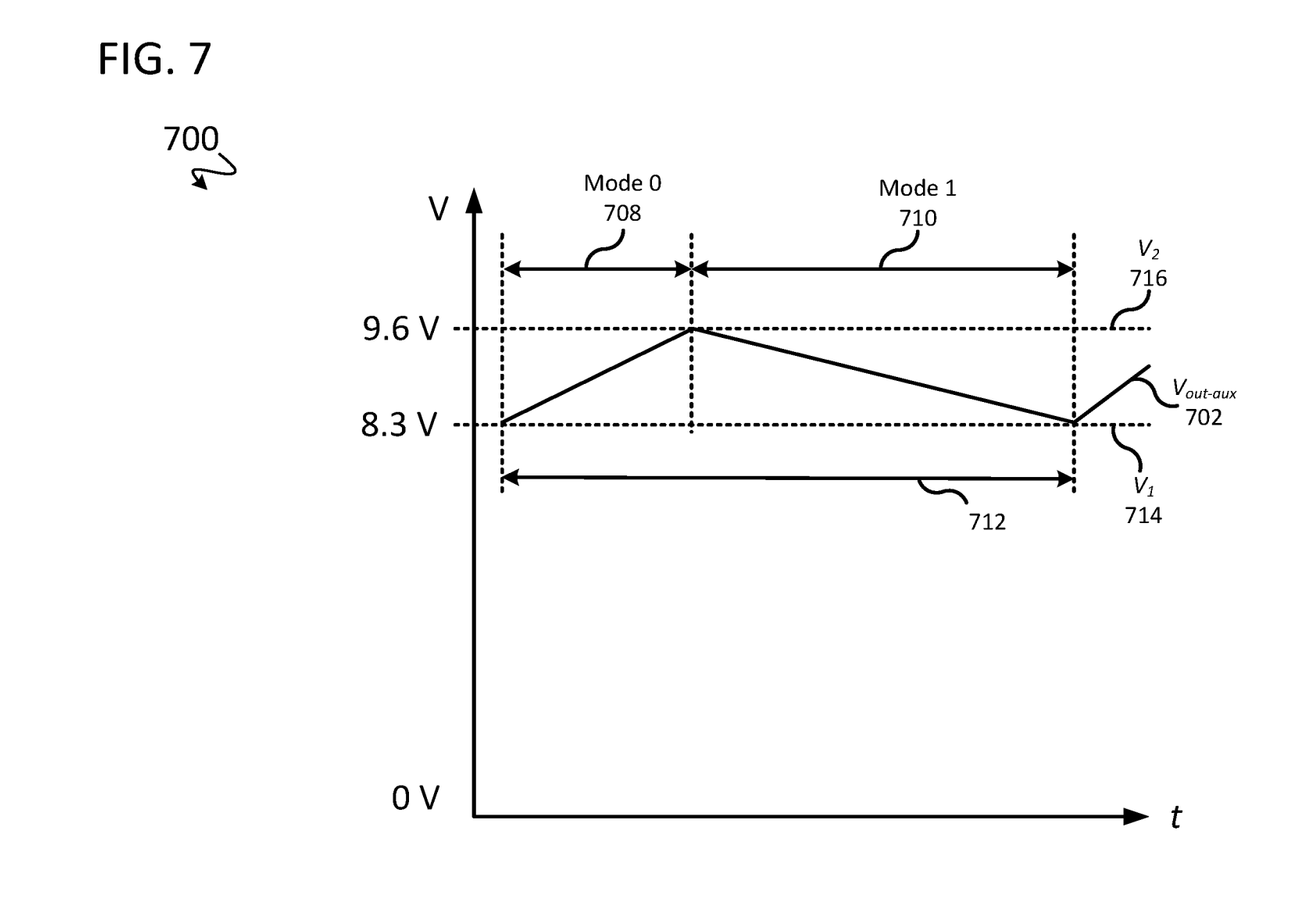
FIG. 7 is a plot of signals related to the operation of the DPM start-up circuit of FIG. 2, in accordance with the present disclosure.

Turning to FIG. 7, a plot 700 of the voltage $V_{out-aux}$ 702 is shown across time t during startup of the power converter 100, in accordance with the present disclosure. During startup of the power converter 100, there is a portion of time during which a voltage of the auxiliary winding 132 is not yet high enough to provide sufficient operating voltage for the power converter 100. During this portion of time, the DPM start-up circuit 130 advantageously generates a regulated voltage $V_{out-aux}$ 702 using the input voltage $V_{HV}$ by toggling between the first mode of operation and the second mode of operation. As shown in FIG. 7, the voltage $V_{out-aux}$ 702 rises from the first threshold voltage level $V_1$ 714 (approximately 8.3 V in this example) while the DPM start-up circuit 130 is configured in the first mode of operation (Mode 0) 708. Upon reaching the second threshold voltage level $V_2$ 716 (approximately 9.6 V in this example), the DPM start-up circuit 130 is configured to the second mode of operation (Mode 1) 710 by the sensing circuit 206. While in the second mode of operation 710, the voltage $V_{out-aux}$ 702 falls from the second threshold voltage level $V_2$ 716 to the first threshold voltage level $V_1$ 714, whereupon the cycle repeats until the auxiliary winding 132 has a sufficient voltage to provide an operating voltage for the power converter 100. In the example shown, each period of regulation 712 is approximately 1-10 ms, depending on capacitance and current consumption of the DPM start-up circuit 130 and of the power converter 100. Such voltage regulation advantageously does not require an analog feedback loop which requires compensation (e.g., using a large compensation capacitor).

It is appreciated by those skilled in the art that the circuits, components, modules, and/or devices of, or associated with, the DPM start-up circuit 130 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

Moreover, reference has been made in detail to examples of implementations of the disclosed invention, one or more examples of which have been illustrated in the accompanying figures. Each example has been provided by way of explanation of the present technology, not as a limitation of the present technology. In fact, while the specification has been described in detail with respect to specific examples of implementations of the invention, it will be appreciated that those skilled in the art, upon attaining an understanding of the foregoing, may readily conceive of alterations to, variations of, and equivalents to these examples of implementations. For instance, features illustrated or described as part of one example of an implementation may be used with example of another implementation to yield a still further example of an implementation. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A dual path and mode start-up circuit comprising:
   a first start-up circuit that is configurable to be operated in a first mode of operation or a second mode of operation;
   a second start-up circuit;
   a first capacitor that is operable to be charged by a first output voltage from the first start-up circuit when the first start-up circuit is in the first mode of operation and by a second output voltage from the second start-up circuit when the first start-up circuit is in the second mode of operation; and
   a sensing circuit that is configured to sense a voltage level at the first capacitor and, in response, configure the first start-up circuit to operate in the first mode of operation if the voltage level at the first capacitor is less than a first threshold voltage level and configure the first start-up circuit to operate in the second mode of operation if the voltage level at the first capacitor is greater than a second threshold voltage level;
   wherein:
   the first start-up circuit generates the first output voltage having a first output voltage level when the first start-up circuit is configured to operate in the first mode of operation; and
   the first start-up circuit generates the first output voltage having a second output voltage level when the first start-up circuit is configured to operate in the second mode of operation.

2. The dual path and mode start-up circuit of claim 1, further comprising:
   a second capacitor that is configured to be charged by the first output voltage from the first start-up circuit when the first start-up circuit is in the first mode of operation.

3. The dual path and mode start-up circuit of claim 1, wherein:
   the first output voltage level is higher than the second output voltage level.

4. The dual path and mode start-up circuit of claim 3, wherein the sensing circuit is configured to:
   generate a first digital output if a sensed voltage level at the first capacitor is less than the first threshold voltage level and generate a second digital output if the sensed voltage level at the first capacitor is greater than the second threshold voltage level, wherein the first digital output configures the first start-up circuit to operate in the first mode of operation and the second digital output configures the first start-up circuit to operate in the second mode of operation.

5. The dual path and mode start-up circuit of claim 4, further comprising:

a bias and control circuit of the first start-up circuit, the bias and control circuit being in signal communication with the sensing circuit and configured to receive the first digital output and the second digital output, the bias and control circuit being configured to configure the first start-up circuit to operate in the first mode of operation upon receiving the first digital output and configure the first start-up circuit to operate in the second mode of operation upon receiving the second digital output.

6. The dual path and mode start-up circuit of claim 5, wherein:
a quiescent current of the bias and control circuit is provided by the second start-up circuit when the first start-up circuit is configured to operate in the second mode of operation.

7. The dual path and mode start-up circuit of claim 1, further comprising:
a first diode in signal communication with the first start-up circuit, the first capacitor, and the second start-up circuit, wherein the first diode is forward biased from the first start-up circuit to the first capacitor and the second start-up circuit.

8. The dual path and mode start-up circuit of claim 7, further comprising:
a resistor in signal communication with the first start-up circuit and the second start-up circuit;
wherein the resistor is configured in parallel with the first diode; and
wherein the resistor is configured to pass a quiescent current from the second start-up circuit to the first start-up circuit when the first start-up circuit is configured to operate in the second mode of operation.

9. The dual path and mode start-up circuit of claim 8, wherein:
the second start-up circuit is in signal communication with an auxiliary winding of an external circuit;
the second start-up circuit is configured to receive an auxiliary current from the auxiliary winding; and
the second start-up circuit is configured to charge the first capacitor using the auxiliary current.

10. The dual path and mode start-up circuit of claim 9, further comprising:
a second capacitor in signal communication with the second start-up circuit; and
a second diode in signal communication with the auxiliary winding, the second start-up circuit, and the second capacitor;
wherein the second diode is forward biased from the auxiliary winding to the second capacitor and the second start-up circuit.

11. The dual path and mode start-up circuit of claim 10, wherein:
the second start-up circuit includes a metal-oxide field-effect transistor having a drain in signal communication with the second capacitor and a source in signal communication with the first capacitor.

12. The dual path and mode start-up circuit of claim 10, wherein:
the second capacitor is charged via a signal path that starts at the first start-up circuit, passes through the first diode, and the second start-up circuit when the first start-up circuit is configured to operate in the first mode of operation.

13. The dual path and mode start-up circuit of claim 8, wherein:

the first start-up circuit includes a field-effect transistor ("FET") having a drain in signal communication with a high-voltage node that is configured to receive a high-voltage input signal and a source in signal communication with the first diode and the resistor.

14. The dual path and mode start-up circuit of claim 8, wherein:
the first start-up circuit, the second start-up circuit, the first diode, and the resistor are integrated on a single integrated circuit.

15. A method comprising:
producing, by a first start-up circuit, a first output voltage having a first output voltage level, when the first start-up circuit is operating in a first mode of operation;
charging a first capacitor using the first output voltage to generate an auxiliary-voltage output in the first mode of operation;
receiving, by a second start-up circuit, an auxiliary current from an auxiliary winding of a transformer;
producing, by the second start-up circuit, a second output voltage;
charging the first capacitor using the second output voltage to generate the auxiliary-voltage output in a second mode of operation;
determining, by a sensing circuit, if the auxiliary-voltage output is less than a first threshold voltage level or if the auxiliary-voltage output is greater than a second threshold voltage level;
configuring the first start-up circuit to operate in the second mode of operation if the auxiliary-voltage output is greater than the second threshold voltage level;
producing the first output voltage having a second output voltage level by the first start-up circuit when the first start-up circuit is in the second mode of operation, the second output voltage level having a voltage level that is lower than the first output voltage level of the first output voltage;
configuring the first start-up circuit to operate in the first mode of operation if the auxiliary-voltage output is less than the first threshold voltage level.

16. The method of claim 15, wherein:
an output of the first start-up circuit is in signal communication with an output of the second start-up circuit.

17. The method of claim 15, wherein:
an input of the second start-up circuit and the auxiliary winding are in signal communication with a second capacitor; and
the method further comprises:
charging, by the first start-up circuit, the second capacitor when the first start-up circuit is in the first mode of operation.

18. The method of claim 15, wherein configuring the first start-up circuit to the first mode of operation and configuring the first start-up circuit to the second mode of operation further comprise:
generating, by the sensing circuit, a first digital output if a sensed voltage level of the auxiliary-voltage output at the first capacitor is less than the first threshold voltage level; and
generating, by the sensing circuit, a second digital output if the sensed voltage level of the auxiliary-voltage output at the first capacitor is greater than the second threshold voltage level, wherein the first digital output configures the first start-up circuit to operate in the first mode of operation and the second digital output configures the first start-up circuit to operate in the second mode of operation.

19. The method of claim 15, further comprising:
   providing, by the second start-up circuit, a quiescent current to a bias and control circuit of the first start-up circuit when the first start-up circuit is configured to operate in the second mode of operation.

\* \* \* \* \*